United States Patent [19]

Matsumoto et al.

[11] Patent Number: 4,957,959

[45] Date of Patent: Sep. 18, 1990

[54] PREPOLYMER COMPOSITION, PROCESS FOR ITS PRODUCTION, AND ITS USE

[75] Inventors: Yukio Matsumoto; Nobuaki Kunii, both of Yokohama, Japan

[73] Assignee: Asahi Glass Company, Ltd., Tokyo, Japan

[21] Appl. No.: 343,373

[22] Filed: Apr. 26, 1989

[30] Foreign Application Priority Data

Apr. 26, 1988 [JP] Japan ................................ 63-101225

[51] Int. Cl.$^5$ .............................................. C08L 75/04
[52] U.S. Cl. ................................ 524/196; 252/182.22; 525/458; 528/59; 528/67
[58] Field of Search .................... 252/182.22; 524/196; 525/45 B; 528/59, 67; 428/421.1

[56] References Cited

U.S. PATENT DOCUMENTS 3,404,131 10/1968 Taub .................................. 260/77.5

FOREIGN PATENT DOCUMENTS 009698 4/1980 European Pat. Off. .
218881 4/1987 European Pat. Off. .
2438948 2/1976 Fed. Rep. of Germany .

OTHER PUBLICATIONS

European Search Report, EP 89 10 6916.3.

Primary Examiner—Maurice J. Welsh
Attorney, Agent, or Firm—Oblon, Spivak, McClelland, Maier & Neustadt

[57] ABSTRACT

Prepolymer composition which comprises 10 to 95% by weight of a first isocyanate-group-containing prepolymer (A) obtained by reacting an excess equivalent of an aromatic diisocyanate (c) containing an isocyanate group directly bonded to the aromatic nucleus with an oxyethylene-group-containing polyoxyalkylene polyol (a) of a relatively high molecular weight; 90 to 5% by weight of a second isocyanate-group-containing prepolymer (B) obtained by reacting an excess equivalent of an organic diisocyanate (d) not containing an isocyanate group directly bonded to the aromatic nucleus with an oxyethylene-group-containing polyoxyalkylene polyol (b) of a relatively high molecular weight; and, as the case may be, an unreacted substance of diisocyanate which has been used in the production of the respective prepolymers (A) and (B), the prepolymer composition containing the isocyanate group in a range of from 3 to 15% by weight, wherein the polyoxyalkylene polyol (a) and the polyoxyalkylene polyol (b) are either same or different each other, each consisting of at least one polyoxyalkylene polyol, and wherein the polyoxyalkylene polyol (a) and the polyoxyalkylene polyol (b) in total contain functional groups in an average number of above 2 but below 3 and have an average hydroxyl value of from 30 to 80 and an average content of the oxyethylene group of from 70 to 95% by weight.

27 Claims, 1 Drawing Sheet

FIGURE 1

PREPOLYMER COMPOSITION, PROCESS FOR ITS PRODUCTION, AND ITS USE

This invention relates to a prepolymer composition for forming a moisture-permeable coating layer or film of polyurethane type resin, a reactively curable type coating composition, a process for production of such prepolymer composition, and use of such prepolymer composition.

It has been known that a moisture-permeable material suitable for use as clothing material and so forth can be produced by forming a substantially non-porous layer of a hydrophilic polyurethane type resin on a porous substrate such as cloth, etc. The layer of this hydrophilic polyurethane type resin absorbs moisture from a high humidity side and discharges moisture to a low humidity side, thereby exercising its effective moisture-permeating function. This layer of the non-porous hydrophilic polyurethane type resin is excellent in its property of not causing clogging of pores and water-tightness, in comparison with layers made of polyurethane type resins having therein a multitude of fine pores formed by conventional methods such as a wet type coagulation method, a method of eluting soluble fine particles, a foaming method, and others. A porous substrate provided with such hydrophilic polyurethane type resin is disclosed, for example, in Japanese Unexamined Patent Publications No. 203172/1983 and No. 222840/1983.

In order to form a layer of the hydrophilic polyurethane resin, it is common to employ a method of forming a coating layer by application onto a porous substrate, either directly or indirectly, a coating composition composed of a solution or a dispersion of a hydrophilic polyurethane type resin, or a mixture of starting materials forming such hydrophilic polyurethane type resin, or a solution and a dispersion thereof. By the term "indirectly", it is meant for a method wherein a coating layer formed on a releasable substrate, which has not yet been cured completely, is laminated on a porous substrate. In some cases, an adhesive may be used for such lamination (vide: the above-mentioned Japanese Unexamined Patent Publication No. 203172/1983). It is also feasible that a sufficiently cured film of a hydrophilic polyurethane type resin is first produced, and then this film is laminated on a porous substrate. This film is usually produced by applying the above-mentioned coating composition on the releasable substrate, followed by its curing. This cured film may be laminated on the porous substrate by a method wherein the film which has been peeled off from the releasable substrate is laminated on the porous substrate, or a method wherein the film, while it is still being held on the releasable substrate, is laminated on the porous substrate, after which the releasable substrate is taken away. For the lamination, the adhesive property or the fusing property of the hydrophilic polyurethane type resin per se can be utilized, or a separate adhesive may also be used. As the adhesive, there may be employed a moisture-permeating adhesive (particularly, the one the moisture-permeability of which can be increased by reducing the thickness of the adhesive layer). Such moisture-permeability can also be maintained by partially disposing such adhesive (e.g., in a dotted form or a linear form).

The hydrophilic polyurethane type resin is usually obtained by reacting a polyol having high hydrophilic property with a polyisocyanate compound, as the principal starting materials. In many cases, use in made of a twopack system coating composition which is a combination of an isocyante-group-containing prepolymer to be obtained by reacting the highly hydrophilic polyol with the polyisocyanate compound, and a curing agent for the prepolymer. As the curing agent, there may be used a polyfunctional active hydrogen compound of a low molecular weight such as, for example, diol, diamine, and others. It is also feasible to use a combination of a hydroxyl-group-containing prepolymer obtained by reacting the highly hydrophilic polyol with the polyisocyanate compound, and a curing agent such as polyisocyanate compound, etc.

As mentioned above, the hydrophilic polyurethane type resin is produced from highly hydrophilic polyol and a polyisocyanate compound, as the principal starting materials. It has been common to use polyoxyethylene glycol as the highly hydrophilic polyol. However, the use of polyoxyethylene glycol has various problems. In the first place, when a higher moisture-permeability is desired, no satisfactory result is obtainable with a hydrophilic polyurethane type resin prepared by use of such conventional polyoxyethylene glycol. That is to say, this hydrophilic polyurethane type resin has a limited moisture-permeability, and it is difficult to attain a moisture-permeability higher than that. In the second place, at the time of curing, e.g., when the isocyanate group-containing prepolymer is to be cured with a curing agent, the curing rate is very low, and it is difficult to cure the same at a relatively high speed after its application with the consequent problems from the standpoint of actual process and economy in its production. In the third place, the isocyanate-group-containing prepolymer obtained by use of polyoxyethylene glycol takes a form of solid or liquid of very high viscosity at a room temperature, the handling of which has been cumbersome and inconvenient. This prepolymer has usually been used in the form of its solution with a solvent. However, the use of a solvent tends to be liable to bring about problems in the environmental sanitation or economy, hence reduction in the quantity of the solvent or development of a coating composition substantially free from the solvent has been longed for. In the fourth and last place, the mechanical properties of the polyurethane type resin obtained by use of polyoxyethylene glycol have not always been satisfactory. With the conventional polyurethane type resin, it was possible to obtain a coating layer or film having flexibility, hence high degree of elongation, but its mechanical strength was low with the consequence that, when the coating layer or film having flexibility, hence a certain degree of elongation, and yet high mechanical strength is desired, the conventional resin could not meet the purpose.

As one expedient for solving the above-mentioned problems, the present inventors have already proposed a coating composition obtained by use of a polyoxyalkylene polyol containing therein the oxyethylene group and other oxyalkylene group, and having three or more functions (vide: United States Patent Applications Ser. No. 903964, and No. 07/229728; European Patent Application No. 218881). This coating composition forms a moisture-permeable coating film of favorable physical properties. It has, however, been found out that, when this composition is made into a two-pack system composition consisting of a combination of an isocyanate-group-containing prepolymer and a curing agent, a problem would possibly arise in respect of stability of the prepolymer. In more detail, when the prepolymer is used in the form of a two-pack system composition, the prepolymer and the curing agent are mixed together immediately before the coating. Therefore, during a storage period after its production up to immediately before its use, the prepolymer becomes apprehensively deteriorated. In particular, such deterioration is apt to take place when the prepolymer has high reactivity (i.e., when the isocyanate group in the prepolymer has high reactivity). This deterioration is considered to be due to moisture in the atmosphere. In order therefore to prevent the prepolymer from such deterioration, it is usually stored in a tightly sealed container. However, it is still apprehended that the deterioration would take place during a period from its production until its storage in the tightly sealed container, and during a period from its take-out from the tightly sealed container until its mixing with the curing agent. Further, even after its mixing with the curing agent, the surface of the curable mixture and the coating layer formed of it may come into contact with moisture in the atmosphere to be deteriorated.

In order to prevent the above-mentioned prepolymer from deterioration, it seems desirable to lower the reactivity of the prepolymer. However, when the reactivity of the prepolymer is lowered to an excessive degree, its reactivity with the curing agent also lowers with the result that the composition consisting of the prepolymer and the curing agent requires a long period of time for its curing.

It is therefore an object of the present invention to provide a prepolymer composition which is to be described hereinbelow, and which has successfully solved the problems as mentioned in the foregoing.

It is another object of the present invention to provide a process for production of such prepolymer composition.

It is still another object of the present invention to provide a reactive curable composition which is a combination of such prepolymer composition and a curing agent.

According to the present invention, in one aspect of it, there is provided a prepolymer composition which comprises 10 to 95% by weight of a first isocyanate-group-containing group-containing prepolymer (A) obtained by reacting an excess equivalent of an aromatic diisocyanate (c) containing an isocyanate group directly bonded to the aromatic nucleus with an oxyethylene-groupcontaining polyoxyalkylene polyol (a) of a relatively high molecular weight; 90 to 5% by weight of a second isocyanate-group-containing prepolymer (B) obtained by reacting an excess equivalent of an organic diisocyanate (d) not containing an isocyanate group directly bonded to the aromatic nucleus with a oxyethylene-group-containing polyoxyalkylene polyol (b) of a relatively high molecular weight; and, as the case may be, an unreacted substance of disocyanate which has been used in the production of the respective prepolymers (A) and (B), the prepolymer composition containing the isocyanate group in a range of from 3 to 15% by weight, wherein the polyoxyalkylene polyol (a) and the polyoxyalkylene polyol (b) are either same or different each other, each consisting of at least one polyoxyalkylene polyol, and wherein the polyoxyalkylene polyol (a) and the polyoxyalkylene polyol (b) in total contain functional groups in an average number of above 2 but below 3 and have an average hydroxyl value of from 30 to 80 and an average content of the oxyethylene group of from 70 to 95% by weight.

According to the present invention, in another aspect of it, there is provided a method for producing a prepolymer composition, which comprises forming the prepolymer (A) by reacting the polyoxyalkylene polyol (a) with the aromatic diisocyanate (c) in the presence of the prepolymer (B), or the prepolymer (B) containing unreacted substance of an organic diisocyanate (d).

According to the present invention, in still another aspect of it, there is provided a reactively curable composition suitable for forming a substantially non-porous coating layer or film of a hydrophilic polyurethane type resin, which is composed of a combination of the above-mentioned prepolymer composition and a curing agent containing an isocyanate group and 2 or more reactive functional groups.

According to the present invention, in further aspect of it, there is provided a moisture-permeable material which comprises a laminated body of a substantially poreless coating layer or film of a hydrophilic polyurethane type resin obtained by reactively curing a mixture of the above-mentioned prepolymer composition and a curing agent containing an isocyanate group and 2 or more reactive functional groups; and a porous substrate.

The prepolymer composition according to the present invention is used for forming a substantially non-porous coating layer or film of hydrophilic polyurethane type resin by reacting it with a curing agent. Such coating layer or film possesses high moisture-permeability, and is superior in its physical properties such as mechanical strength, etc. Further, the prepolymer composition according to the present invention possesses an appropriate reactivity and is difficult to be deteriorated. Moreover, the reactively curable composition obtained by mixing the prepolymer composition with a curing agent has its characteristic such that it becomes hardened in a relatively short period of time.

The feature of the present invention resides in that two kinds of prepolymers having different reactivity are contained in the prepolymer composition. That is to say, the prepolymer (A) as the first prepolymer according to the present invention is one having a highly reactive isocyanate group which is bonded to the aromatic nucleus, while the prepolymer (B) as the second prepolymer is one having an isocyanate group of relatively low reactivity, which is not the isocyanate group bonded to the aromatic nucleus. The prepolymer (A) is necessary for securing the high reactivity for the prepolymer composition, while the prepolymer (B) is necessary for preventing the reactivity of the prepolymer composition from becoming excessively high. A mixing ratio of the prepolymer (A) and the prepolymer (B) in the prepolymer composition ranges from 10 to 95% by weight of the former, and from 90 to 5% by weight of the latter. The reason for such wide range of the compositional ratio of the prepolymers is that the ratio may be largely varied depending on the molecular weight of the polyoxyalkylene polyol which will be mentioned later. In case this compositional ratio is expressed in terms of a ratio of the isocyanate groups, it is preferable that the ratio of the isocyanate group directly bonded to the aromatic nucleus be about 45 to 85 mol% and the ratio of the isocyanate group not directly bonded to the aromatic nucleus be 55 to 15 mol%, based on the total of both isocyanate groups. Further, even when the isocyanate group in the unreacted diisocyanate which will be mentioned later, is taken into consideration, the ratio of the isocyanate group in the former prepolymer (A) of the prepolymer composition should preferably be from 45 to 90 mol%, while the isocyanate group in the latter prepolymer (B) should be from 55 to 10 mol%. In case the polyoxyalkylene polyol (a) and the polyoxyalkylene polyol (b) as the starting materials for the prepolymers, about which mentioned will be made later, have substantially close hydroxyl values (i.e., when the hydroxyl value of the latter prepolymer is within a range of ±20 relative to the hydroxyl value of the former prepolymer), the ratio of the prepolymer (A) with respect to the total of both prepolymers (A) and (B) should preferably range from 45 to 85% by weight. Also, since the unreacted diisocyanate has a low molecular weight, the ratio of the prepolymer (A) with respect to the total of the three components should preferably range from 45 to 85% by weight, even if such unreacted diisocyanate is taken into consideration. The ratio of the unreacted diisocyanate with respect to the total of the three components should preferably be in a range of from 0 to 15% by weight, or more preferably from 1 to 15% by weight. Furthermore, the content of the isocyanate group in the prepolymer composition consisting, in total, of the prepolymer (A), the prepolymer (B), and the unreacted diisocyanate should be in a range of from 3 to 5% by weight, or more preferably from 3 to 10% by weight. Moreover, from the aspect of its handling, the prepolymer composition should have as low a vioscosity as possible. The prepolymer composition consisting of the three components alone, i.e. the prepolymer (A), the prepolymer (B) and the unreacted diisocyanate, should preferably have its viscosity of approximately 12,000 cp or below at 25° C., or more preferably approximately 10,000 cp or below, or the most preferably approximately 8,500 cp or below. With this viscosity, the composition can be used for the purpose of forming the coating layer without substantial use of a solvent.

The prepolymer (A) is one obtained by reacting an excess equivalent of an aromatic diisocyanate (c) with a polyoxyalkylene polyol (a) which will be mentioned later. The equivalent ratio of the aromatic diisocyanate (c) should be approximately 1.6 times or above the equivalent of the polyoxyalkylene polyol (a), or more preferably twice or more. With a low equivalent ratio of the aromatic diisocyanate (c), the prepolymer takes a high molecular weight and tends to be highly viscous. Ideally, therefore, it is preferred to use the aromatic diisocyanate (c) of a quantity greater than that, with which one more molecular of the aromatic diisocyanate (c) per one hydroxyl group in the polyoxyalkylene polyol (a) reacts, i.e., two times as large as the equivalent. For the prodution of the prepolymer (A) having the sufficiently low viscosity, it is preferable that the quantity of use of the aromatic diisocyanate (c) should exceed twice as large as the equivalent, when considering the fact that a molecular-weight-increasing reaction takes place as a side reaction. On the other hand, a portion of the aromatic diisocyanate (c), which exceeds twice as large as the equivalent with respect to its quantity of use, remains in the prepolymer (A) as an unreacted portion. When this unreacted aromatic diisocyanate (c) increases too much, the quantity of the highly reactive isocyanate group in the prepolymer composition increases accordingly with the consequence that not only the solution of the above-mentioned problem would become difficult, but also various physical properties of the hydrophilic polyurethane type resin to be finally obtained, such as flexibility, elongation, etc., would be reduced. It is therefore preferable that the quantity of use of the aromatic diisocyanate (c) should ultimately be five times or lower the equivalent with respect to the polyoxyalkylene polyol (a), or more preferably four times o lower the equivalent. The word "ultimately" is meant for that, after production of the prepolymer (A) with use of a much larger amount of the aromatic diisocyanate (c), a part or whole of the uneacted aromatic diisocyanate (c) can be removed, in which case use is made of a quantity of the aromatic diisocyanate (c). with the above-mentioned removed part thereof being excluded. A preferred quantity of use of the aromatic diisocyanate (c) should be in a range of from about two to five times as large as the equivalent with respect to the polyoxyalkylene polyol (a), or more preferably from about 2.5 to 4 times as large as the equivalent. Within this range of the quantity of use, there is no particular need for removing the unreacted aromatic diisocyanate (c).

There is no particular limitation to the method for production of the prepolymer (A). However, for the purpose of avoiding increase in the molecular weight of the resulting prepolymer, there may be adopted a method, in which the polyoxyalkylene polyol (a) is added to the aromatic diisocyanate (c). The reaction is usually conducted under heating. If necessary, a catalyst may be used.

The aromatic diisocyanate (c) is a compound having two isocyanate groups bonded to the aromatic nucleus. Two or more kinds of diisocyanates may be used for the purpose. Representative examples of the aromatic diisocyanate are diphenylmethane diisocyanate (MDI) and tolylene diisocyanate (TDI). Besides these, there may be exemplified naphthalene diisocyanate, tolidine diisocyanate, phenylene diisocyanate, and so forth. It is also feasible to use a modified diisocyanate obtained by modifying the aromatic diisocyanate, examples of which are a prepolymer modified body which has been modified with diols, a carbodiamide modified body, a urea modified body, and others. Of these modified bodies, particularly preferred are 4,4'-diphenylmethane diisocyanate, 2,4'-diphenylmethane diisocyanate, 2,4'-diphenylmethane diisocyanate, 2,4-tolylene diisocyanate, 2,6-tolylene diisocyanate, and mixtures thereof. Of both diphenylmethane diisocyanate and tolylene diisocyanate, the former is preferred for the reason that it is capable of producing the hydrophilic polyurethane type resin excellent in its physical properties such as mechanical strength, etc., and less liable to yellowing, and apt to be less tacky. Accordingly, for the purpose of the present invention, diphenylmethane diisocyanate or its modified bodies are particularly preferred as the aromatic polyisocyanate (c), and, in particular, pure diphenylmethane diisocyanate is desirable. Incidentally, the content of the isocyanate group in the aromatic diisocyanate (c) is 20% by weight or above, or more preferably 28% by weight or above.

The prepolymer (B) is obtained by reacting an excess equivalent of an organic diisocyanate (d) with a polyoxyalkylene polyol (b). As is the case with the prepolymer (A), the quantity of use of the organic diisocyanate (d) with respect to the polyoxyalkylene polyol (b) is 1.6 times or more as large as the equivalent, or preferably from 2 to 5 times as large as the equivalent, or most preferably about 2.1 to 3.5 times as large as the equivalent. Since the organic diisocyanate (d) has lower reactivity than the aromatic diisocyanate (c), increase in quantity of the unreacted substance is not desirable. It is therefore preferable that the quantity of the unreacted substance of the organic diisocyanate (d) be equal to, or smaller than, that of the unreacted substance of the aromatic diisocyanate (c), in terms of the equivalent. Incidentally, by the above-mentioned term of "unreacted diisocyanate" in the prepolymer composition according to the present invention, it is meant the total quantity of both the aromatic diisocyanate (c) and the organic diisocyanate (d). While the prepolymer (B) can also be produced by the same method as in the production of the above-mentioned prepolymer (A), a relatively long period of time is required under the same degree of the reaction temperature in view of low reactivity of the isocyanate group. It is feasible to use a catalyst. However, if this catalyst remains in the prepolymer composition, undesirable influence ma take place in the reaction between the prepolymer composition and a curing agent. Therefore, the production of the prepolymer (B) is usually done in the absence of any catalyst. For the same reason, it is desirable that production of the prepolymer (A) be carried out in the absence of a catalyst.

The organic diisocyanate (d) is one which does not contain the isocyanate group directly bonded to the aromatic nucleus. Examples of such organic diisocyanate are an aliphatic diisocyanate, an alicyclic diisocyanate, an aromatic diisocyanate having two isocyanate alkyl groups, and modified products thereof. For the production of the prepolymer composition according to the present invention, one or more kinds of these organic diisocyanates (d) may be used. As the representative organic diisocyanates (d), there may be exemplified hexamethylene diisocyanate, isophorone diisocyanate, methylene bis(cyclohexylisocyanate), cyclohexane diisocyanate, lysine diisocyanate, xylylene diisocyanate and tetramethylxylylene diisocyanate. In a mixture of the prepolymer composition and a curing agent, a relatively quick curing rate is preferable from the standpoint of productivity. Also, if the reactivity between the prepolymer (A) and the prepolymer (B) is considerably different, the physical properties of the hydrophilic polyurethane type resin are also likely to lower, so that the organic diisocyanate (d) should preferably contain the isocyanate group of high reactivity. In this sense, use of xylylene diisocyanate, hexamethylene diisocyanate, isophorone diisocyanate, and so on is recommended. Use of xylylene diisocyanate is the most preferable. The content of the isocyanate group in the organic diisocyanate should be 30% by weight or above, more preferably, 35% by weight or above.

The polyoxyalkylene polyol (a) and the polyoxyalkylene polyol (b) to be used as the starting materials for the production of the respective prepolymers according to the present invention should both be taken into consideration as a whole. If and when these both polyols are assumed to be a mixture, an average number of its functional group should be above 2, but below 3, an average hydroxyl value should be in a range of from 30 to 80, and an average content of the oxyethylene group should be in a range of from 70 to 95% by weight. This presumed mixture of polyoxyalkylene polyols (a) and (b) will hereinafter be called "polyoxyalkylene polyol (a+b)". From the above-mentioned requirement for the average number of the functional group, the polyoxyalkylene polyol (a+b) contains therein at least on polyoxyalkylene diol and at least one polyoxyalkylene polyol having three or more functions. The polyoxyalkylene polyol having three or more functions should preferably be a single body or a mixture of 3 to 8 functional polyols. In particular, at least one polyoxyalkylene triol or polyoxyalkylene tetraol is preferable. A polyoxyalkylene triol is particularly preferable. It should be mentioned, that polyoxyalkylene polyols having the sam number of functional groups may also be in the form of a mixture of two or more different kinds of polyols. That is to say, a polyoxyalkylene diol, for example, may be a mixture of two or more different kinds of polyoxyalkylene diols.

The polyoxyalkylene polyol (a+b) should have an average hydroxyl value in a range of from 30 to 80, although the hydroxyl value of each individual polyoxyalkylene polyol in this polyoxyalkylene polyol (a+b) may be outside this range. However, presence of a polyol having very high hydroxyl value (i.e., low molecular weight) would impart unfavorable influence on the physical properties of the hydrophilic polyurethane type resin. Accordingly, the hydroxyl value in each individual polyoxyalkylene polyol should in most cases be 120 or below, or more preferably 100 or below, though premitting a few exceptions. For the same reason, the lower limit of the hydroxyl value in each individual polyoxyalkylene polyol should be 20, or more preferably 30. More preferred polyoxyalkylene polyol (a+b) consists only of a mixture of polyoxyalkylene polyols with the hydroxyl value being substantially in a range of from 30 to 80.

An average content of the oxyethylene group in the polyoxyalkylene polyol (a+b) is required to be in a range of from 70 to 95% by weight. As the content of the oxyethylene group becomes high, the hydrophilic property of the hydrophilic polyurethane type resin improves and the moisture-permeating property thereof becomes high. However, a polyoxyalkylene polyol having extremely high content of the oxyethylene group is solid at a normal temperature, which tends to cause inconvenience in its handling at the time of production of the prepolymer, and the viscosity of the resulting prepolymer becomes also high. In addition, the physical properties of the hydrophilic polyurethane type resin may become lowered in some cases. For these reasons, the average content of the oxyethylene group in the polyoxyalkylene polyol (a+b) should preferably be lower than 90% by weight. The optimum range of its average content is from 75 to 85% by weight.

As mentioned above, the polyoxyalkylene polyol (a+b) contains a polyoxyalkylene diol which improves flexibility and elongation of the hydrophilic polyurethane type resin. On the other hand, a polyoxyalkylene polyol having three or more functions improves the mechanical strength of the hydrophilic polyurethane type resin and increases its hardness. On the other hand, diphenylmethane diisocyanate, which is the most preferred aromatic diisocyanate (c) as mentioned in the foregoing, increases the mechanical strength and hardness of the hydrophilic polyurethane type resin. From the trend of variations in these physical properties, the polyoxyalkylene polyol (a+b) should preferably contain a relatively large amount of a polyoxyalkylene diol. As a matter of source, the larger the hydroxyl value in the polyoxyalkylene diol is (i.e., the smaller the molecular weight is), the harder becomes the hydrophilic polyurethane type resin. Contrary to this, the smaller the hydroxyl value in the polyoxyalkylene polyol having three or more functions is, the softer becomes the hydrophilic polyurethane type resin. Accordingly, the ratio of polyoxyalkylene diol in polyoxyalkylene polyol (a+b) may suitably be from 30 to 95% by weight, although it is governed by the hydroxyl value in both the polyoxyalkylene diol and the polyoxyalkylene polyol having three or more functions, when it is in a range of from about 30 to 80. More preferably, the ratio should be in a range of from 50 to 95% by weight. Further, when a difference of 20 or below exists in the hydroxyl value between the polyoxyalkylene diol and the polyoxyalkylene polyol having three or more functions, the ratio of the polyoxyalkylene diol in the polyoxyalkylene polyol (a+b) should preferably be from 55 to 95% by weight.

For the respective individual polyoxyalkylene polyols to be contained in polyoxyalkylene polyol (a+b), there may be employed various kinds, provided that such individual polyoxyalkylene polyols should have the hydroxyl value of from 20 to 120, or preferably from 20 to 100, or most preferably from 30 to 80. Further, the content of the oxyethylene group in each individual polyoxyalkylene polyol should preferably be 50% by weight or above, or more preferably from 55 to 95% by weight, or most preferably from 70 to 90% by weight. Of these various polyoxyalkylene polyols, there may possibly exist a small quantity of a polyoxyalkylene polyol having the hydroxyl value which exceeds 120 and the content of the oxyethylene group not reaching 50% by weight. It should, however, be kept in mind that such exceptional polyoxyalkylene polyol, even when it possibly exists, should be 10% by weight or below relative to the polyoxyalkylene polyol (a+b).

The polyoxyalkylene polyol is produced by adding an alkylene oxide to a polyhydric initiator. In the production of all or most of polyoxyalkylene polyols, ethylene oxide is indispensable as the alkylene oxide. Furthermore, in many cases, it is necessary to use other alkylene oxide than ethylene oxide. While it is feasible to use polyoxyethylene polyol (which is a polyoxyalkylene polyol having the oxyethylene group alone as the oxyalkylene group) as a component in a small quantity, a high molecular weight compound of this component assumes a solid state at a normal temperature, hence its use in a large quantity is difficult. Although a low molecular weight polyoxyethylene polyol (i.e, having a high hydroxyl value) can be used, there is a great apprehension such that, when it is used as the principal polyoxyalkylene polyol, the average hydroxyl value in the polyoxyalkylene polyol (a+b) will exceed the above-mentioned range. It is therefore preferable that a major portion of the weight of the polyoxyalkylene polyol (a+b) should preferably be occupied by such polyoxyalkylene polyol that contains therein, as the oxyalkylene group, both an oxyethylene group and other oxyalkylene groups. While the oxypropylene group is preferred as the oxyalkylene group other than the oxyethylene group, a random copolymer chain of the oxybutylene group and other oxyalkylene groups has a greater effect of lowering the melting point of the polyoxyalkylene polyol than a block copolymer chain of both oxybutylene group and other oxyalkylene groups, hence the former is preferred. Such random copolymer chain is obtained by the addition-reaction of a mixture of ethylene oxide and other alkylene oxides such as propylene oxide. The quantity of such other alkylene oxides with respect to the total of ethylene oxide and other alkylene oxides should preferably be 5% by weight at least.

As the polyhydric initiator, there may be used those initiators having 2 to 8 (more preferably 2 to 4) hydrogen atoms bonded to oxygen or nitrogen atoms such as polyhydric alcohols, polyhydric phenols, alkanol amines, mono- or poly-.amines, and others. The following are the preferred initiators ethylene glycol, diethylene glycol, propylene glycol, dipropylene glycol, 1,4-butanediol, 1,6-hexanediol, neo-pentyl glycol, glycerol, trimethylol propane, diglycerol, pentaerythritol, and other polyhydric alcohols. By the way, when an alkylene oxide is to be added to the polyhydric initiator, there may be employed a mixture of two or more kinds of compounds as the polyhydric initiator.

The polyoxyalkylene polyol (a) and the polyoxyalkylene polyol (b) are resulted from appropriate division of the above-mentioned polyoxyalkylene polyol (a+b). Both polyoxyalkylene polyol (a) and polyoxyalkylene polyol (b) may be mixtures polyoxyalkylene polyols of the same compositions or mixtures of polyoxyalkylene polyols of different compositions; or one of them may be a mixture of polyoxyalkylene diols, and the other be a mixture of polyoxyalkylene polyols having three or more function. Otherwise, one of them may be a mixture of two or more kinds of polyoxyalkylene polyols, and the other be one kind of a polyoxyalkylene polyol. In particular, when the quantity of use of the polyoxyalkylene polyol having three or more functions is small, it is preferred that one of them is a mixture consisting of polyoxyalkylene diol alone, and the other is a mixture of a polyoxyalkylene diol and polyoxyalkylene polyol having three or more functions. From the necessity for the prepolymer (A) and the prepolymer (B) to be within a range of a particular compositional ratio as mentioned above, the polyoxyalkylene polyol (a) and the polyoxyalkylene polyol (b) should accordingly be in a certain definite range of ratio for use. The reason for this is that, when the ratio of use of the polyoxyalkylene polyol on one part is made excessive or insufficient, the ratio of use of the above-mentioned prepolymer (A) and (B) would be out of the range. In case there is no large difference in the molecular weight between the above-mentioned two diisocyanates (c) and (d), the ratio of use of the polyoxyalkylene polyol (a) and the polyoxyalkylene polyol (b) will be in the substantially same range as that of the above-mentioned prepolymer (A) and the prepolymer (B). Incidentally, each of the polyoxyalkylene polyol (a) and the polyoxyalkylene polyol (b) should preferably have an average number of functional groups of about 2 to 3, an average hydroxyl value group of from 20 to 120, an average content of the oxyethylene group of 50% by weight or above. More preferably, these polyoxyalkylene polyols should have the average number of functional groups of from 2 to 3, the average hydroxyl value of 30 to 80, and the average content of the oxyethylene group of 70 to 90% by weight.

The prepolymer composition according to the present invention is obtained by first producing the prepolymer (A) which may contain the unreacted aromatic diisocyanate (c) and the prepolymer (B) which may contain the unreacted organic diisocyanate (d), and then mixing these prepolymers. If need be, the aromatic diisocyanate (c) or the organic diisocyanate (d) may further be added, and other diisocyanates may also be added, as the case may be. In addition, the prepolymer composition may contain additives for these prepolymers and diisocyanates. As an example, addition of a solvent may contribute to lower the viscosity of the prepolymer composition. However, since the solvent is most likely to bring about problems in working environment, it is not desirable to add the solvent in a substantial quantity. There may further be added various other additives such as stabilizers, plasticizers, falme retarders, catalysts, coloring matters or fillers. It is particularly preferred to add a stabilizer which is capable of preventing the prepolymers or the hydrophilic polyurethane type resin from deterioration. Examples of such stabilizer are oxidation inhibitors, ultraviolet ray absorbers or light stabilizers. More specifically, there may be examplified phenolic type oxidation inhibitors, phosphorus type oxidation inhibitors, benzotriazole type ultraviolet ray absobers, benzophenone type ultraviolet ray absorbers and hindered piperidine type light stabilizers.

The prepolymer composition according to the present invention can be produced, as mentioned in the foregoing, by first obtaining the individual prepolymers and then mixing these prepolymers. However, for preventing the prepolymer composition from deterioration during its production, there is a more preferable method of producing such prepolymer composition, which is to first produce the prepolymer (B), and subsequently to produce the prepolymer (A) in the presence of the prepolymer (B). Since this method does not involve the step of mixing both prepolymers (A) and (B), the resulting prepolymers are not only easy to handle, but also less liable to come into contact with moisture in the atmosphere, hence less apprehension of their being deteriorated. On the other hand, it is difficult to adopt a method in which the prepolymer (B) is produced in the presence of the prepolymer (A), because of difference in the reactivity of diisocyanate in these prepolymers.

The prepolymer (B) can be obtained by adding the polyoxyalkylene polyol (b]to the organic diisocyanate (d). This addition-reaction should be conducted to a satisfactory extent such that the hydroxyl group in the polyoxyalkylene polyol (b) becomes substantially nonexistent in the resulting prepolymer (B). Since the prepolymer (B) contains, in most case, an excessive amount of the organic diisocyanate (d), the aromatic diisocyanate (c) is added to the reaction sytem, and then the polyoxyalkylene polyol (c) is added for carrying out the reaction. At this latter stage of the reaction, it may be considered that reaction takes place between the polyoxyalkylene polyol (c) and an excess amount of theorganic diisocyanate (d) or the prepolymer (B). However, since the activity of the organic diisocyanate (d) is extremely low in comparison with that of the aromatic diisocyanate (c), and since the activity of the prepolymer (B) is much lower than that of the aromatic diisocyanate (c), the reaction between the polyoxyalkylene polyol (a) and the organic diisocyanate (d) or the prepolymer (B) does not substantially take place so far as the aromatic diisocyanate (c) is present in a sufficient quantity. Accordingly, the polyoxyalkylene polyol (a) selectively reacts with the aromatic diisocyanate (c) to yield the prepolymer (A). When adopting this method, it is necessary that the aromatic diisocyanate (c) be present in a sufficiently excess equivalent. With the lower equivalent of the aromatic diisocyanate (c), there will be an increased possibility of the reaction to take place between the polyoxyalkylene polyol (a) and the organic diisocyanate (d) or the prepolymer (B).

For the above-mentioned reason, it is difficult to adopt a method for producing the prepolymer (B) in the presence of the prepolymer (A). After all, even when the polyoxyalkylene polyol (b) and the organic diisocyanate (d) are caused to react in the presence of the prepolymer (A), a reaction takes place between the polyoxyalkylene polyol (b) and an excess amount of the aromatic diisocyanate (c), or between the polyoxyalkylene polyol (b) and the prepolymer (A). Also, for the same reason, it is difficult to produce the prepolymer composition of the present invention by reacting the polyoxyalkylene polyol (a+b) and a mixture of the aromatic diisocyanate (c) and the organic diisocyanate (d).

In the production of the prepolymer and the prepolymer composition, it is usually preferable not to use a catalyst such as an organic metallic catalyst, amine type catalyst, or others, because presence of a catalyst is liable to accelerate deterioration of the prepolymers. For suppressing the deterioration of the prepolymers, it is preferable to have the above-mentioned stabilizer mixed from the beginning of production of the prepolymers. The reaction temperature for producing the prepolymers should preferably be 40° C. and above, at which no deterioration would possibly take place on the prepolymers and the diisocyanates. In particular, it is preferable to carry out the reaction at a temperature ranging from 60° to 120° C. for the production of the prepolymer (B). While this temperature range may also be applicable to the production of the prepolymer (A), the reaction may be done at a temperature of 60° C. or below, or at a normal temperature, because the aromatic diisocyanate (c) has high activity.

The prepolymer composition according to the present invention should preferably be used for the production of substantially poreless coating layer or film of a hydrophilic polyurethane type resin. This prepolymer composition can be cured with moisture. For instance, after forming a coating layer of this prepolymer composition, it can be left in the air containing moisture for curing. On the other hand, it is also possible to obtain such hydrophilic polyurethane type resin by first mixing with this prepolymer composition a curing agent or a poly-functional and relatively low molecular weight compound, so-called a chain extender, containing 2 or more functional groups reactive with an isocyanate group (this compound will hereinafter be called "curing agent"), and then by causing the ingredients to react each other for curing. In particular, when it is desired to increase the rate of the reactive curing, use of a curing agent is effective. The rate of this reactive curing can also be adjusted depending on the kind of the curing agent used. Generally, curing agents containing an amino group are faster in the rate of reactive curing than those containing a hydroxyl group. It is of course possible to adjust the curing rate by the temperature condition. Appropriate curing agents are polyols, polyamines and alkanolamines having a molecular weight of 400 or below, of which bifunctional compounds are particularly preferable. Actual examples of the curing agents are ethylene glycol, diethylene glycol, dipropylene glycol, 1,4-butane diol, neopentyl glycol, hydroquinone diethyloyl ether, 3,3'-dichloro-4,4'-diaminodiphenyl methane (MOCA), 1,2-bis(2-aminophenylthio)ethane, trimethylene glycol-di-p-aminobenzoate, di(methylthio)toluene diamine, methylene dianiline, diethyltoluene diamine, toluene diamine, isophorone diamine, ethylene diamine, tetramethylene diamine, hexamethylene diamine and N-alkyl diethanol amine. Complexes and salts of a diamine may also be used. The quantity of use of these curing agents should preferably be in a range of from 0.7 to 1.2 equivalent with respect to 1 equivalent of the prepolymer composition. It is further possible that, by use of a curing agent in its quantity of use smaller than the above-mentioned range, both reactive curing by the curing agent and reactive curing by the above-mentioned moisture can be effected simultaneously. When the curing agent is to be mixed with the prepolymer composition, there may be mixed simultaneously those additives which can be mixed with the above-mentioned prepolymer composition. In case a stabilizer is mixed with the prepolymer composition, however, it should preferably be added during or immediately after production of the prepolymers. A catalyst may also be mixed with the reactively curable composition which is composed of the prepolymer and the curing agent in mixture. Examples of the catalysts are organic metallic compound type catalysts such as organic tin compounds, etc., and tertiary amine type catalysts such as triethylene diamine, etc. In particular, the organic metallic compounds type catalysts are preferable.

The hydrophilic polyurethane type resin can be obtained by the reactive curing of a reactively curable composition composed of the prepolymer composition and the curing agent in combination. This hydrophilic polyurethane type resin should preferably be used for the production of substantially poreless coating layer or film. Such coating layer or film can be formed by a method of applying the reactively curable composition on a porous substrate such as cloth, etc., followed by curing the same, or by a method of applying the reactively curable composition on a substrate having the releasable surface thereon, followed by curing the same. While no particular limitation is imposed on the use of the reactively curable composition, it is especially utilized for the manufacture of the clothing material.

For the porous substrate, there may be used gas-permeable material having a multitude of micro-pores. Actual examples of such gas-permeable material are woven cloth, unwoven cloth, knitted fabrics, and other cloths; micro-porous plastic films, micro-porous plastic sheets, paper, natural leather, artificial leather, and other gas-permeable materials. Particularly preferable are polyesters fibers, nylon fibers, acrylic fibers, polyolefin fibers, and other synthetic fibers; cotton, wool, silk, and other natural fibers; cloths made of rayon fibers, glass fibers, and other fibers; and micro-porous films and sheets made of polyolefin, fluorine resin, polyester, and other plastic materials. In particular, for the production of the moisture-permeable, water-proofing sheet useful as the clothing material, it is preferable to use those hydrophobic cloths and micro-porous hydrophobic plastic films, which have been processed into macro-porous substrates. There is no particular limitation to the thickness of the substantially poreless coating film of the hydrophilic polyurethane type resin, which has been formed by applying the resin material on the porous substrate, followed by curing the same. However, a range of from 0.001 m to 1 mm is appropriate. Even in the case of laminating, on a porous substrate, the film or sheet of the hydrophilic polyurethane type resin which has been formed by applying the material on the substrate having the releasable surface thereon, curing the thus coated resin material, and then peeling the cured film from the releasable surface, it is preferable that the thickness of the film or the sheet be still in the above-mentioned range.

In the following, the present invention will be explained in more detail with reference to preferred examples thereof and the accompanying drawing in conjunction with several comparative examples so as to enable those persons skilled in the art to readily put this invention into practice. It should, however, be noted that the present invention is not restricted to these examples alone, but any changes and modifications may be made without departing from the spirit and scope of the invention as recited in the appended claims.

In the drawing, single

In the Examples according to the present invention and the Comparative Examples, various ingredients were used at the starting materials, as follows.

Diol A: Polyoxyethylene oxypropylene diol having a hydroxyl value of 56.1 and a content of the oxyethylene group of 80% by weight, which was obtained by adding a mixture of ethylene oxide and propylene oxide to propylene oxide.

Triol B: Polyoxyethylene oxypropylene triol having a hydroxyl value of 48.1 and a content of the oxyethylene group of 80% by weight, which was obtained by adding a mixture of ethylene oxide and propylene oxide to glycerol.

Diol C: Polyoxyethylene oxypropylene diol having a hydroxyl value of 112.2 and a content of the oxyethylene group of 80% by weight, which was obtained by adding a mixture of ethylene oxide and propylene oxide to propylene glycol.

Triol D: Polyoxyethylene oxypropylene triol having a hydroxyl value of 84.2 and a content of the oxyethylene group of 80% by weight, which was obtained by adding a mixture of ethylene oxide and propylene oxide to glycerine.

Diol E: Polyoxyethylne oxypropylene diol having a hydroxyl value of 22.4 and a content of the oxyethylene group of 80% by weight, which was obtained by adding a mixture of ethylene oxide and propylene oxide to propylene glycol.

Diol F: Polyoxyethylene oxypropylene diol having a hydroxyl value of 44.9 and a content of the oxyethylene group of 75% by weight, which was obtained by adding a mixture of ethylene oxide and propylene oxide to propylene glycol.

MDI: 4,4'-Diphenylmethane diisocyanate.

XDI: Xylylene diisocyanate.

TDI: A mixture of 2,4-tolylene diisocyanate and 2,6-tolylene diisocyanate in a weight ratio of 80/20.

HDI: Hexamethylene diisocyanate.

Ultraviolet ray absorbing agent: A benzotriazol type compound (a product of Ciba-Geigy A.G., which is sold under a tradename of "THINUBIN-328").

Light-stabilizer: Hindered piperidine type compound (a product of Ciba-Geigy A.G., which is sold under a tradename of "THINUBIN-144").

EXAMPLE 1

9.4 parts by weight of XDI was charged in a reaction vessel which had been substituted with nitrogen, to which 40 parts by weight of diol A (an NCO/OH ratio of 2.5) was added under agitation, and the batch was heated to a temperature of 100° C. As the result of continuing the reaction for four hours, it was verified that a theoretical quantity of XDI had been reacted. Successively, 24.4 parts by weight of MDI was added to the reaction product under agitation at a temperature of 100° C., with further addition of 0.13 part by weight each of the ultraviolet ray absorbing agent and the light-stabilizer, and then 50 parts by weight of diol A and 10 parts by weight triol B (an NCO/OH ratio of the MDI and these polyols in total being 3.34) in the sequence as mentioned, and the batch was subjected to reaction for 1.5 hours.

The prepolymer composition thus obtained had a viscosity of 6,200 cp at 25° C. and a content of the isocyanate group of 6.00% by weight. This prepolymer composition will hereinafter be called "prepolymer [I]".

To this prepolymer [I], there was admixed ethylene glycol of a quantity to bring the NCO/OH ratio of 1.2, and then the mixture was applied on mold release paper to a thickness of 0.05 mm. Subsequently, this coated mold release paper was adhered onto nylon taffeta of 70 deniers and left in an isothermal chamber at a temperature of 100° C. for three hours to cure the resin, after which the mold release paper was peeled off. The thus obtained coating layer was subjected to measurement of its moisture permeability in accordance with the Japanese Industrial Standard JIS-Z-0208.

On the other hand, the prepolymer [I] and ethylene glycol were mixed at the same ratio as mentioned above, and the mixture was applied on mold release paper to a thickness of 0.2 mm. This coated mold release paper was then left in an isothermal chamber at 100° C. for three hours to cure the resin. The thus obtained film of the hydrophilic polyurethane resin having 0.2 mm thickness was subjected to measurement of its physical properties is accordance with JIS-K-6301.

Further, the prepolymer [I] and ethylene glycol were mixed at the same ratio as mentioned above, and measurement was carried out to find a time until the mixture attained its gel state at 100° C., which will hereinafter be called "gelling time".

The results of these tests are shown in Table 1 below.

[Reactivity Test]

Reactivity of the prepolymer [I] and that of the following prepolymers [II] and [III] were compared, provided that the same stabilizer as used in the prepolymer [I] was mixed with the prepolymers [II] and [III] at the same weight ratio.

(a) Prepolymer [II]: MDI type prepolymer containing therein unreacted MDI and having a content of the isocyanate group of 6.26%, which was obtained by adding 50 parts by weight of diol A and 10 parts by weight of triol B to 24.4 parts by weight of MDI, and then reacting the ingredients for 1.5 hours at 100° C.

(b) Prepolymer [III]: MDI type prepolymer containing therein unreacted MDI and having a content of the isocyanate group of 5.45% by weight, which was obtained by adding 22 parts by weight of diol A and 51 parts by weight of triol B to 27 parts by weight of MDI, and then reacting the ingredients for 1.5 hours at 100° C.

Figure 1:
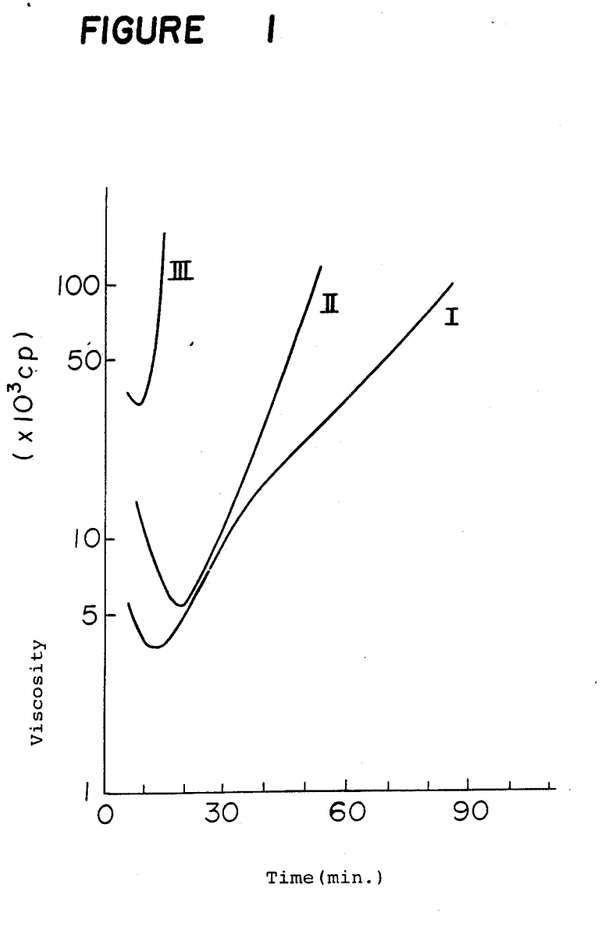
FIG. 1 is a graphical representation showing a relationship between the reaction time and the viscosity change of the prepolymers [I], [II] and [III] used in the ensuing examples.

To each of these prepolymers, 1,4-butane diol was added in a quantity to bring the NCO/OH ratio of 1.02, and then changes in viscosity of the curable composition was measured at 70° C. FIG. 1 shows a relationship of the viscosity changes with respect the reaction time, in which the curve [I] denotes the viscosity changes of the prepolymer [I]; the curve [II] represents the viscosity changes of the prepolymer [II]; and the curve [III] indicates the viscosity changes of the prepolymer [III].

EXAMPLE 2

8.5 parts by weight of XDI was charged in a reaction vessel which had been substituted with nitrogen, to which 20 parts by weight of diol A and 20 parts by weight of triol B (an NCO/OH ratio of XDI and these polyols in total being 2.5) were added under agitation, and the batch was heated to a temperature of 100° C. As the result of continuing the reaction for four hours, it was verified that a theoretical quantity of XDI had been reacted. Successively, 24.3 parts by weight of MDI was added to the reaction product under agitation at a temperature of 100° C., with further addition of 0.13 part by weight each of the ultraviolet ray absorbing agent and the light-stabilizer, and then 60 parts by weight diol A (an NCO/OH ratio of 3.31) in the sequence as mentioned, and the batch was subjected to reaction for 1.5 hours.

The prepolymer composition thus obtained had a viscosity of 8,100 cp at 25° C. and a content of the isocyanate group of 6.00% by weight. Thereafter, this prepolymer composition was subjected to the same test as carried out in Example 1 above.

EXAMPLE 3

9.4 parts by weight of XDI was charged in a reaction vessel which had been substituted with nitrogen, to which 40 parts by weight of diol A (an NCO/OH ratio of 2.5) was added under agitation, and the batch was heated to a temperature of 100° C. As the result of continuing the reaction for four hours, it was verified that a theoretical quantity of XDI had been reacted. Successively, 15.7 parts by weight of TDI was added to the reaction product under agitation at a temperature of 100° C., with further addition of 0.125 part by weight each of the ultraviolet ray absorbing agent and the light-stabilizer, and then 40 parts by weight diol A and 20 parts by weight of triol B (an NCO/OH ratio of TDI and these polyols in total being 3.18) in the sequence as mentioned, and the batch was subjected to reaction for two hours.

The prepolymer composition thus obtained had a viscosity of 4,000 cp at 25° C. and a content of the isocyanate group of 6.00% by weight. Thereafter, this prepolymer composition was subjected to the same test as carried out in Example 1 above.

EXAMPLE 4

18.8 parts by weight of XDI and 80 parts by weight of diol A (an NCO/OH ratio of 2.5) were charged in a reaction vessel, to which 0.1 part by weight each of the ultraviolet ray absorbing agent and the light-stabilizer was added, and the batch was heated to a temperature of 100° C. for reaction for four hours. This reaction product had a viscosity of 3,600 cp at 25° C. and a content of the isocyanate group of 4.78% by weight.

Into a separate reaction vessel, there was charged 48.8 parts by weight of MDI, to which 0.17 part by weight each of the ultraviolet ray absorbing agent and the light-stabilizer was added, with further addition of 100 parts by weight of diol A and 20 parts by weight of triol B (an NCO/OH ratio of MDI and these polyols in total being 3.34) in the sequence as mentioned, and the batch was subjected to reaction for 1.5 hours. The reaction product had a viscosity of 8,300 cp at 25° C. and a content of the isocyanate group of 6.26% by weight.

Subsequently, 49.4 parts by weight of the former XDI type reaction product and 84.4 parts by weight of the latter MDI type reaction product were sufficiently mixed in the nitrogen atmosphere. The thus obtained mixed prepolymer composition had its viscosity of 6,500 cp at 5° C. and a content of the isocyanate group of 5.70% by weight. Thereafter, this prepolymer composition was subjected to the same test as carried out in Example 1 above.

EXAMPLE 5

8.4 parts by weight of HDI was charged in a reaction vessel which had been substituted with nitrogen, to which 40 parts by weight of diol A (an NCO/OH ratio of 2.5) was added under agitation, and the batch was heated to a temperature of 100° C. As the result of continuing the reaction for 8 hours, it was verified that a theoretical quantity of HDI has been reacted. Successively, 24.4 parts by weight of MDI was added to the reaction product under agitation at a temperature of 100° C., with further addition of 0.13 part by weight each of the ultraviolet ray absorbing agent and the light-stabilizer, and then 50 parts by weight diol A and 10 parts by weight of triol B (an NCO/OH ratio of MDI and these polyols in total being 3.34) in the sequence as mentioned, and the batch was subjected to reaction for 1.5 hours.

The prepolymer composition thus obtained had a viscosity of 7,500 cp at 25° C. and a content of the isocyanate group of 6.20% by weight. Thereafter, this prepolymer composition was subjected to the same test as carried out in Example 1 above.

EXAMPLE 6

7.5 parts by weight of HDI was charged in a reaction vessel which had been substituted with nitrogen, to which 40 parts by weight of diol F (an NCO/OH ratio of 2.5) was added under agitation, and the batch was heated to a temperature of 100° C. As the result of continuing the reaction for four hours, it was verified that a theoretical quantity of HDI had been reacted. Subsequently, 21.3 parts by weight of MDI was added to the reaction product under agitation at a temperature of 100° C., with further addition of 0.13 part by weight each of the ultraviolet ray absorbing agent and the light-stabilizer, and then 40 parts by weight of diol A and 20 parts by weight of triol B (an NCO/OH ratio of MDI and these polyols in total being 3.50) in the sequence as mentioned, and the batch was subjected to reaction for 1.5 hours.

The prepolymer composition thus obtained had a viscosity of 7,000 cp at 25° C. and a content of the isocyanate group of 5.50% by weight. Thereafter, this prepolymer composition was subjected to the same test as carried out in Example 1 above.

COMPARATIVE EXAMPLE 1

Under the same conditions as in the preceding examples, various tests were conducted with use of the above-mentioned prepolymer [II].

COMPARATIVE EXAMPLE 2

Under the same conditions as in the preceding examples, various tests were conducted with use the above mentioned prepolymer [III].

COMPARATIVE EXAMPLE 3

35.1 parts by weight of MDI was charged in a reaction vessel, to which 0.13 part by weight each of the ultraviolet ray absorbing agent and the light-stabilizer was added, followed by further addition of 100 parts by weight of diol A (an NCO/OH ratio of 2.8), and the batch was reacted at a temperature of 100° C. for 1.5 hours. The prepolymer composition thus obtained had a viscosity of 9,000 cp at 25° C. and a content of the isocyanate group of 5.58% by weight. This prepolymer composition was subjected to the same test as conducted in Example 1 above.

COMPARATIVE EXAMPLE 4

16.5 parts by weight of XDI was charged in a reaction vessel, to which 40 parts by weight of diol C (an NCO/OH ratio of 2.2) was added under agitation, and the batch was heated to a temperature of 100° C. As the result of continuing the reaction for four hours, it was verified that a theoretical quantity of XDI had been reacted. Subsequently, 31.7 parts by weight of MDI was added to the reaction product under agitation at a temperature of 100° C., with further addition of 0.14 part by weight each of the ultraviolet ray absorbing agent and the light-stabilizer, and then 50 parts by weight of diol C and 10 parts by weight of triol D (an NCO/OH ratio of MDI and these polyols in total being 2.2) in the sequence as mentioned, and the batch was subjected to reaction for 1.5 hours.

The prepolymer composition thus obtained had a viscosity of 12,500 cp at 25° C. and a content of the isocyanate group of 6.50% by weight. Thereafter, this prepolymer composition was subjected to the same test as carried out in Example 1 above.

COMPARATIVE EXAMPLE 5

4.5 parts by weight of XDI was charged in a reaction vessel, to which 40 parts by weight of diol E (an NCO/OH ratio of 3.0) was added under agitation, and the batch was heated to a temperature of 100° C. As the result of continuing the reaction for four hours, it was verified that a theoretical quantity of XDI had been reacted. Subsequently, 10.6 parts by weight of MDI was added to the reaction product under agitation at a temperature of 100° C., with further addition of 0.12 part by weight each of the ultraviolet ray absorbing agent and the light-stabilizer, and then 50 parts by weight of diol E and 10 parts by weight of triol B (an NCO/OH ratio of MDI and these polyols in total being 3.0) in the sequence as mentioned, and the batch was subjected to reaction for 1.5 hours.

The prepolymer composition thus obtained was solidified into crystals at 25° C. and its content of the isocyanate group was 3.10% by weight. Thereafter, this prepolymer composition was subjected to the same test as carried out in Example 1 above.

TABLE 1

|  | Viscosity of prepolymer (cp) | Gelling time (min.) | Moisture permeability (g/m² · 24 hr · 0.05 mm) | Elongation (0.2 mm) % | 100% modulus (kg/cm²) | Tensile strength (kg/cm²) |
| --- | --- | --- | --- | --- | --- | --- |
| Ex. 1 | 6,200 | 29 | 11,500 | 597 | 18 | 91 |
| Ex. 2 | 8,100 | 23 | 10,500 | 560 | 22 | 100 |
| Ex. 3 | 4,000 | 38 | 12,000 | 610 | 15 | 72 |
| Ex. 4 | 6,500 | 28 | 11,000 | 590 | 18 | 90 |

TABLE 1-continued

| | Viscosity of prepolymer (cp) | Gelling time (min.) | Moisture permeability (g/m² · 24 hr · 0.05 mm) | Elongation (0.2 mm) % | 100% modulus (kg/cm²) | Tensile strength (kg/cm²) |
|---|---|---|---|---|---|---|
| Ex. 5 | 7,500 | 39 | 11,000 | 570 | 19 | 80 |
| Ex. 6 | 7,500 | 32 | 12,000 | 630 | 17 | 85 |
| Comp. Ex. 1 | 8,300 | 10 | 8,800 | 520 | 20 | 85 |
| Comp. Ex. 2 | 19,000 | 12 | 6,500 | 140 | 30 | 39 |
| Comp. Ex. 3 | 9,000 | 45 (tacky) | 11,000 | 620 | 15 | 43 |
| Comp. Ex. 4 | 12,500 | 15 | 5,000 | 320 | 27 | 75 |
| Comp. Ex. 5 | solid | 50 (tacky) | 12,000 | 750 | 13 | 50 |

The prepolymer composition according to the present invention is less liable to deterioration in comparison with the prepolymer produced by using the aromatic diisocyanate (c) alone, and is quicker in its rate of reaction than the prepolymer produced by the using the organic diisocyanate (d) alone, hence it can be cured in a relativey short period of time. In addition, owing to the use of the polyoxyalkylene polyol (a+b), the coating layer or film of high moisture-permeability can be obtained. Further, on account of the fact that the prepolymer composition has a low viscosity and does not contain any solvent, it is not only advantageous, when used, from the standpoint of environmental sanitation, but also is advantageous from the standpoint of economy due to low energy cost for curing the prepolymer composition. Furthermore, since the prepolymer composition according to the present invention has high elongation and mechanical strength as well, the prepolymer composition has the characteristics such that it can be made into pliable film and laminated cloth having better feeling.

What is claimed is:

1. A prepolymer composition which comprises 10 to 95% by weight of a first isocyanate-group-containing prepolymer (A) obtained by reacting an excess equivalent of an aromatic diisocyanate (c) containing an isocyanate group directly bonded to the aromatic nucleus with an oxyethylene-group-containing polyoxyalkylene polyol (a) of a relatively high molecular weight; 90 to 5% by weight of a second isocyanate-group-containing prepolymer (B) obtained by reacting an excess equivalent of an organic diisocyanate (d) not containing an isocyanate group directly bonded to the aromatic nucleus with an oxyethylene-group-containing polyoxyalkylene polyol (b) of a relatively high molecular weight; and, as the case may be, an unreacted substance of diisocyanate which has been used in the production of said respective prepolymers (A) and (B), said prepolymer composition containing the isocyanate group in a range of from 3 to 15% by weight, wherein said polyoxyalkylene polyol (a) and said polyoxyalkylene polyol (b) are either same or different each other, each consisting of at least one polyoxyalkylene polyol, and wherein said polyoxyalkylene polyol (a) and said polyoxyalkylene polyol (b) in total contain functional groups in an average number of above 2 but below 3 and have an average hydroxyl value of from 30 to 80 and an average content of the oxyethylene group of from 70 to 95% by weight.

2. A prepolymer composition according to claim 1, wherein said prepolymer composition contains from 45 to 85% by weight of said prepolymer (A) relative to the total of said prepolymer (A) and said prepolymer (B).

3. A prepolymer composition according to claim 1, wherein said prepolymer composition contains from 1 to 15% by weight of unreacted substance of diisocyanate relative to the total of said prepolymer (A), said prepolymer (B) and said unreacted substance of diisocyanate.

4. A prepolymer composition according to claim 1, wherein each of said polyoxyalkylene polyol (a) and said polyoxyalkylene polyol (b) is composed of one or more polyoxyalkylene polyols having an average number of functional groups of from 2 to 3, an average hydroxyl value of from 20 to 120 and an average content of the oxyethylene group of 50% by weight or above.

5. A prepolymer composition according to claim 1, wherein the ratio of the polyoxyalkylene diol relative to the total of said polyoxyalkylene polyol (a) and said polyoxyalkylene polyol (b) is from 30 to 95% by weight.

6. A prepolymer composition according to claim 1, wherein said prepolymer composition is composed of the prepolymer (A) obtained by reacting twice as high as the equivalent of the aromatic diisocyanate (c) with the polyoxyalkylene polyol (a); and the prepolymer (B) obtained by reacting twice as high as the equivalent of the organic diisocyanate (d) with the polyoxyalkylene polyol (b).

7. A prepolymer composition according to claim 1, wherein said aromatic diisocyanate (c) is diphenylmethane diisocyanate.

8. A prepolymer composition according to claim 1, wherein said organic diisocyante (d) is xylylene diisocyanate.

9. A method for production of the prepolymer composition according to claim 1, which comprises forming a prepolymer (A) by reacting the polyoxyalkylene polyol (a) with the aromatic diisocyanate (c) in the presence of a prepolymer (B) or a prepolymer (B) containing therein unreacted substance of the organic diisocyanate (d).

10. A method for producing the prepolymer composition according to claim 9, wherein said prepolymer composition contains 45 to 85% by weight of said prepolymer (A) relative to the total of said prepolymer (A) and said prepolymer (B).

11. A method for producing the prepolymer composition according to claim 9, wherein said prepolymer composition contains from 1 to 15% by weight of the unreacted substance of diisocyanate relative to the total of said prepolymer (A), said prepolymer (B), and said unreacted substance of diisocyanate.

12. A method for producing the prepolymer composition according to claim 9, wherein the ratio of the polyoxyalkylene diol relative to the total of said polyoxyalkylene polyol (a) and said polyoxyalkylene polyol (b) is from 30 to 95% by weight.

13. A method for producing the prepolymer composition according to claim 9, wherein said prepolymer composition is composed of the prepolymer (A) obtained by reacting twice as high as the equivalent of the aromatic diisocyanate (c) with the polyoxyalkylene polyol (a); and the prepolymer (B) obtained by reacting twice as high as the equivalent of organic diisocyanate (d) with the polyoxyalkylene polyol (b).

14. A method for producing the prepolymer composition according to claim 9, wherein said aromatic diisocyanate (c) is diphenymethane diisocyanate, and said organic diisocyanate (d) is xylene diisocyanate.

15. A reactively curable composition suitable for forming a substantially poreless coating layer or film of a hydrophilic polyurethane type resin, which consists of a combination of a prepolymer composition according to claim 1 and a curing agent containing 2 or more functional groups reactive with an isocyanate group.

16. A reactively curable composition according to claim 15, wherein said prepolymer composition contains 45 to 85% by weight of said prepolymer (A) relative to the total of said prepolymer (A) and said prepolymer (B).

17. A reactively curable composition according to claim 15, wherein said prepolymer composition contains from 1 to 15% by weight of the unreacted substance of diisocyanate relative to the total of said prepolymer (A), said prepolymer (B) and said unreacted substance of diisocyanate.

18. A reactively curable composition according to claim 15, wherein the ratio of polyoxyalkylene diol relative to the total of said polyoxyalkylene polyol (a) and said polyoxyalkylene polyol (b) is from 30 to 95% by weight.

19. A reactively curable composition according to claim 15, wherein said prepolymer composition is composed of the prepolymer (A) obtained by reacting twice as high as the equivalent of the aromatic diisocyanate (c) with the polyoxyalkylene polyol (a); and the prepolymer (B) obtained by reacting twice as high as the equivalent of the organic diisocyanate (d) with the polyoxyalkylene polyol (b).

20. A reactively curable composition according to claim 15, wherein said aromatic diisocyanate (c) is diphenylmethane diisocyanate, and said organic diisocyanate (d) is xylylene diisocyanate.

21. A moisture-permeable material, which comprises a laminated body of a substantially poreless coating layer or film of a hydrophilic polyurethane type resin obtained by reactively curing a mixture of the prepolymer composition according to claim 1 and a curing agent containing 2 or more functional groups reactive with an isocyanate group; and a porous substrate.

22. A mositure-permeable material according to claim 21, wherein said prepolymer compositon contains 45 to 85% by weight of said prepolymer (A) relative to the total of said prepolymer (A) and said prepolymer (B).

23. A moisture-permeable material according to claim 21, wherein said prepolymer composition contains from 1 to 15% by weight of the unreacted substance of diisocyanate relative to the total of said prepolymer (A), said prepolymer (B) and said unreacted substance of diisocyanate.

24. A moisture-permeable material according to claim 21, wherein the ratio of polyoxyalkylene diol to the total of said polyoxyalkylene polyol (a) and said polyoxyalkylene polyol (b) is from 30 to 95% by weight.

25. A moisture-permeable material according to claim 21, wherein said prepolymer composition is composed of the prepolymer (A) obtained by reactive twice as high as the equivalent of the aromatic diisocyanate (c) with polyoxyalkylene polyol (a); and the prepolymer (B) obtained by reactive twice as high as the equivalent of the organic diisocyanate (d) with the polyoxyalkylene polyol (b).

26. A moisture-permeable material according to claim 21, wherein said aromatic diisocyanate (c) is diphenylmethane diisocyanate, and said organic diisocyanate (d) is xylylene diisocyanate.

27. A moisture-permeable material according to claim 21, wherein said porous substrate is cloth, or micro-porous film or sheet of plastic.

* * * * *